United States Patent
Lee

(10) Patent No.: US 8,012,262 B2
(45) Date of Patent: Sep. 6, 2011

(54) PROCESS FOR STEEPING CORN AND STEEPING SYSTEM THEREFORE

(75) Inventor: Chie Ying Lee, Fremont, CA (US)

(73) Assignee: Fluid-Quip, Inc., Springfield, OH (US)

( * ) Notice: Subject to any disclaimer, the term of this patent is extended or adjusted under 35 U.S.C. 154(b) by 166 days.

(21) Appl. No.: 12/480,241

(22) Filed: Jun. 8, 2009

(65) Prior Publication Data

US 2010/0307484 A1    Dec. 9, 2010

(51) Int. Cl.
*C08B 1/00* (2006.01)
(52) U.S. Cl. .......... 127/28; 127/45; 127/23; 127/68; 426/461; 426/481
(58) Field of Classification Search ............. 127/28, 127/45
See application file for complete search history.

(56) References Cited

U.S. PATENT DOCUMENTS

| | | | | |
|---|---|---|---|---|
| 2,322,413 | A * | 6/1943 | Bishop et al. | 127/68 |
| 3,236,740 | A * | 2/1966 | Smith et al. | 435/161 |
| 4,106,487 | A * | 8/1978 | Randall et al. | 127/23 |
| 4,181,748 | A * | 1/1980 | Chwalek et al. | 426/623 |
| 4,207,118 | A * | 6/1980 | Bonnyay et al. | 127/24 |
| 4,412,867 | A | 11/1983 | Cicuttini | |
| 4,761,186 | A | 8/1988 | Schara et al. | |
| 5,067,982 | A * | 11/1991 | Caransa et al. | 127/67 |
| 5,198,035 | A * | 3/1993 | Lee et al. | 127/67 |
| 6,566,125 | B2 | 5/2003 | Johnston et al. | |
| 6,648,978 | B2 * | 11/2003 | Liaw et al. | 127/67 |
| 2007/0020375 | A1 * | 1/2007 | Jansen et al. | 426/622 |

FOREIGN PATENT DOCUMENTS

EP    0379232    * 1/2009

OTHER PUBLICATIONS

Effects of steep time and So2 concentration on steepwater profiles and maize milling yields using a continuous countercurrent steep system. By Ping Yang et al. Starch (1999). 341-348.*
Effect of Selected organic and inorganic acids on Corn Wet-Milling Yields. By Lind Du et al. (Cereal Chemisxtry. 1996).*

* cited by examiner

*Primary Examiner* — Melvin C Mayes
*Assistant Examiner* — Colette Nguyen
(74) *Attorney, Agent, or Firm* — Wood, Herron & Evans, LLP

(57) ABSTRACT

The present invention is directed to improvements in the steeping process of corn wet milling and a steeping system therefore. The process for steeping corn includes subjecting corn situated in a battery of no less than four steeping tanks to a countercurrent flow of steep water. The first steeping tank defines a new corn receiving tank and the last steeping tank defines a discharge tank. The countercurrent flow of steep water includes sulfur dioxide and flows in a direction from the discharge tank to the new corn receiving tank. The sulfur dioxide concentration in the steep water of the first steeping tank is greater than the sulfur dioxide concentrations in a plurality of the remainder of the steeping tanks, which maintain sulfur dioxide levels that are substantially equivalent.

14 Claims, 1 Drawing Sheet

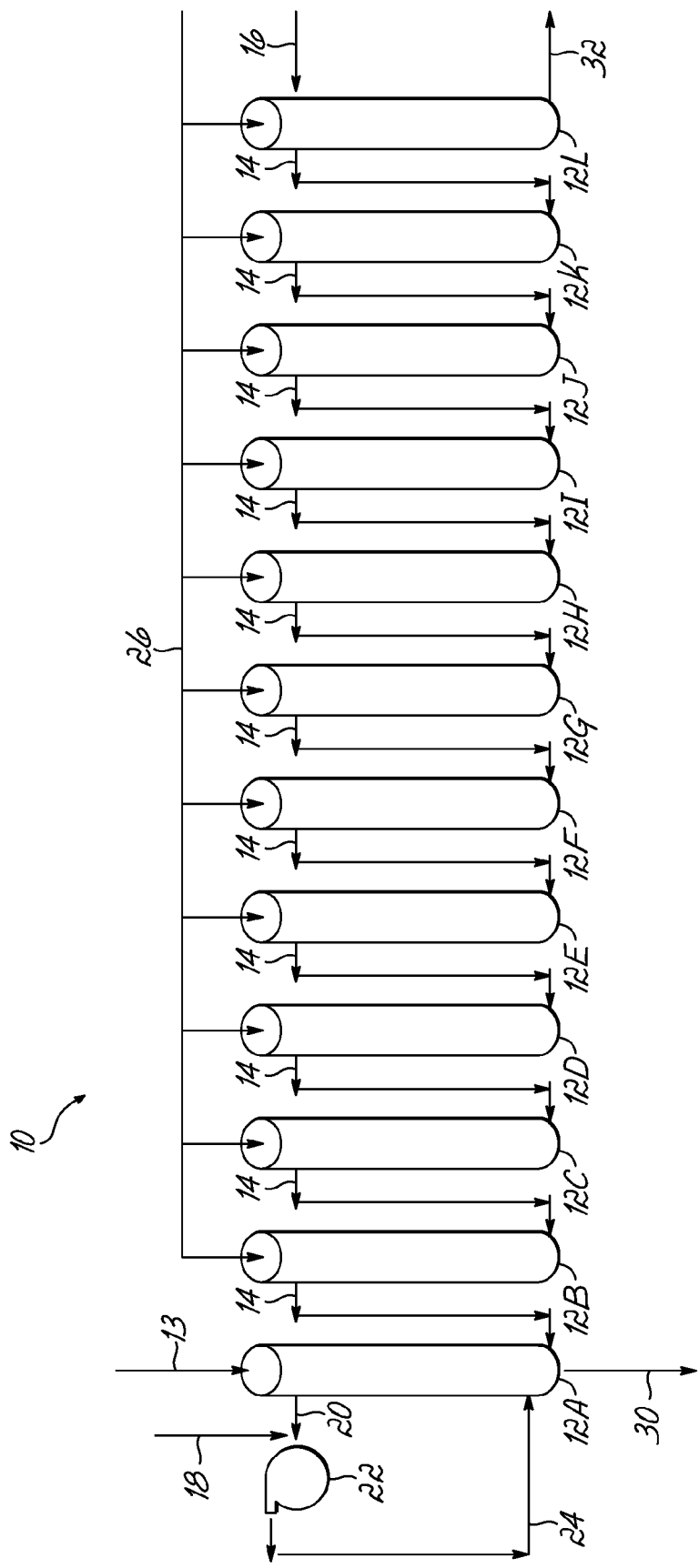

PROCESS FOR STEEPING CORN AND STEEPING SYSTEM THEREFORE

TECHNICAL FIELD

The present invention relates generally to corn wet milling, which involves separating and recovering the various constituents of corn, primarily germ, fiber, starch, and protein, and more specifically, to improvements in the steeping process of corn wet milling and a steeping system therefore.

BACKGROUND

The corn wet milling process generally starts with dry or wet (fresh) corn kernels that have been inspected and cleaned to remove cobs, chaff, and other debris. This cleaned corn is typically filled into a battery of large steeping tanks or steeps, where the corn is soaked in hot water. Each steep is generally equipped with piping to move steep water from one steep to another, to pass it through a heat exchanger, and/or to withdraw it from the system. The steeping is generally carried out in a continuous countercurrent process, i.e., the flow of water is countercurrent to the flow or movement of corn in the steeps. Small amounts of sulfur dioxide have been conventionally added to the process or steep water at the beginning of the countercurrent process. Over time, the corn swells from absorbing the sulfur dioxide water, which, in combination with mild acid conditions, helps to soften the corn so as to optimize separation of corn components.

A proper soaking or steeping is essential for desirable corn component yields and quality. Steeping, however, is more than simple water soaking of corn. It generally involves complex and interrelated variables, including maintaining a correct balance of water flow, temperature, sulfur dioxide concentration, and an adequate population of lactic acid bacteria, for example. Also, the steeping process, which can last up to 50 hours or more, is typically the slowest part of the corn wet milling process. Because of that, a reduction in overall steeping time can realize significant cost savings at least in terms of decreased energy consumption and can generate additional revenue in terms of increased output. While wet mill operations are continually looking for ways to reduce overall steeping time, they are also generally looking for ways to increase component yields, e.g., starch yields, while maintaining desirable quality.

It would thus be beneficial to provide an improved process for steeping corn in a corn wet milling process and a steeping system therefore, which can increase component yields, such as starch yields, for example, while maintaining desirable quality and which may decrease the overall steeping time.

SUMMARY OF THE INVENTION

The present invention is directed to improvements in the steeping process of corn wet milling and a steeping system therefore.

In one embodiment, the process for steeping corn includes subjecting corn situated in a battery of no less than four steeping tanks to a countercurrent flow of steep water. The first steeping tank defines a new corn receiving tank, the last steeping tank defines a discharge tank, and the countercurrent flow of steep water includes sulfur dioxide and flows in a direction from the discharge tank to the new corn receiving tank. The sulfur dioxide concentration in the steep water of the first steeping tank is greater than the sulfur dioxide concentrations in a plurality of the remainder of the steeping tanks, which maintain sulfur dioxide levels that are substantially equivalent.

In another embodiment, the process for steeping corn includes subjecting corn situated in a battery of no less than four steeping tanks and no greater than twenty steeping tanks to a countercurrent flow of steep water. The first steeping tank defines a new corn receiving tank, the last steeping tank defines a discharge tank, and the countercurrent flow of steep water includes sulfur dioxide and flows in a direction from the discharge tank to the new corn receiving tank. Additional sulfur dioxide is added to the first steeping tank so that the sulfur dioxide concentration in the steep water of the first steeping tank is greater than the sulfur dioxide concentrations in a plurality of the remainder of the steeping tanks. The sulfur dioxide levels in the plurality of the remainder of the steeping tanks are maintained at a substantially equivalent concentration.

In another embodiment, a corn steeping system includes a battery of no less than four steeping tanks. The first steeping tank defines a new corn receiving tank and the last steeping tank defines a discharge tank. Each tank is equipped to receive corn and a countercurrent flow of steep water, which includes sulfur dioxide and flows in a direction from the discharge tank to the new corn receiving tank. The corn steeping system is configured to provide a sulfur dioxide concentration in the steep water of the first steeping tank that is greater than the sulfur dioxide concentrations in a plurality of the remainder of the steeping tanks, which maintain sulfur dioxide levels that are substantially equivalent.

BRIEF DESCRIPTION OF THE DRAWINGS

The accompanying drawing, which is incorporated in and constitutes a part of this specification, illustrates an embodiment of the invention and, together with a general description of the invention given above, and the detailed description of the embodiments given below, serve to explain the principles of the invention.

The FIGURE is a diagrammatic illustration of a corn steeping process and steeping system in accordance with an embodiment of the invention.

DETAILED DESCRIPTION OF SPECIFIC EMBODIMENTS

The FIGURE depicts an embodiment of a process for steeping corn in a corn wet milling process and a steeping system 10 therefore.

The steeping system 10, as shown in the FIGURE, includes a battery of twelve steeping tanks 12A-12L for receiving and steeping dry or wet (fresh) corn, which can be loaded into the steeping tanks 12A-12L from an overhead conveyor (not shown). The first steeping tank 12A defines a new corn receiving tank that receives new corn, as identified by numeral 13, and the last steeping tank 12L defines a discharge tank. In the steeping process and system 10, the corn in each tank 12A-12L is subjected to a countercurrent flow of steep water, i.e., the steep water flows in a direction from the discharge tank 12L to the new corn receiving tank 12A. As is understood in the art, each steeping tank 12A-12L is generally equipped with piping 14 to move the steep water from one steeping tank to another, to pass it through a heat exchanger (not shown) where desired, and to withdraw it from the system 10.

Each steeping tank 12A-12L is configured to be cut into and out of the system 10, as is understood in the art depending upon whether the tank 12A-12L is at the beginning of or finishing the steeping process. In particular, in the steeping process, the new corn receiving tank 12A contains the newest or freshest corn undergoing steeping. This new corn receiving tank 12A receives its steep water from steeping tank 12B via piping 14, which receives its steep water from steeping tank 12C via piping 14, and so on down the line as shown and as understood in the art. After the first steeping period, the steep water in the first tank 12A generally is removed from the steeping system via piping, as identified by numeral 30, and forwarded to all evaporator (not shown). The discharge tank 12L contains the oldest or longest steeped corn, which is discharged after its final steeping period, such as by being emptied through an orifice at the bottom of the tank 12L for further processing in the corn wet mill system, as identified by numeral 32. After which time, the discharge tank 12L is cut out of the process, and then can be cut back into the process after receiving new dry or fresh corn. As a result, the discharge tank 12L, for example, now defines new corn receiving tank 12A, previous new corn receiving tank 12A now defines steeping tank 12B, and steeping tank 12K now defines discharge tank 12L, as is understood in the art.

The incoming steep water, as identified by numeral 16, includes a desired concentration of sulfur dioxide, which aids in separating and recovering the various constituents of the steeped corn, primarily germ, fiber, starch, and protein. The sulfur dioxide can be directly bubbled into the incoming steep water or a sulfur dioxide forming compound, such as sulfurous acid or alkali metal sulfites, bisulfates, or metabisulfates (e.g., sodium sulfite, sodium bisulfate sodium metabisulfite), and the like, can be added thereto. In one example, the initial concentration of sulfur dioxide is greater than 400 ppm sulfur dioxide. In another example, the initial concentration of sulfur dioxide is greater than 400 ppm and no greater than 2500 ppm. In yet another example, the initial concentration of sulfur dioxide is from 1000 ppm to 2500 ppm. In still another example, the initial concentration of sulfur dioxide is from 1200 ppm to 2000 ppm.

With continuing reference to the FIGURE, additional sulfur dioxide is added to the first steeping tank 12A by piping out steep water from the first tank 12A, as identified by numeral 20, and adding sulfur dioxide thereto, as identified by numeral 18. Again, the sulfur dioxide can be directly bubbled into the outgoing steep water or a sulfur dioxide forming compound, such as sulfurous acid or alkali metal sulfites, bisulfates, or metabisulfates (e.g., sodium sulfite, sodium bisulfate, sodium metabisulfite), and the like, can be added thereto. That steep water, which may be optionally heated via a heater 22, is directed back to the first steeping tank 12A, as identified by numeral 24, so that the sulfur dioxide concentration in the steep water of the first steeping tank 12a is greater than a plurality of the remainder of steeping tanks 12B-12L. In one example, the increased sulfur dioxide concentration in the steep water of the first steeping tank 12A is no less than 700 ppm and no greater than 1300 ppm. In another example, the sulfur dioxide concentration in the steep water of the first steeping tank 12A is no less than 800 ppm and no greater than 1200 ppm. In yet another example, the sulfur dioxide concentration in the steep water of the first steeping tank 12A is no less than 800 ppm and no greater than 1000 ppm. In still another example, the sulfur dioxide concentration is about 800 ppm.

The corn in the new corn receiving tank 12A is immediately subjected to, i.e., in direct contact with, high levels of sulfur dioxide at the beginning of the steeping period. This allows for a high amount of sulfur dioxide (and lactic acid) to absorb into the corn kernel in the first hours of steeping. This also increases sulfur dioxide levels (and lactic acid) inside the kernel and can decrease the steeping time and the bacteria actability (wild yeast) inside the kernel so a desirable amount of the sugar inside the kernel can be used to produce lactic acid. The increased sulfur dioxide levels (and lactic acid levels) help decrease the bound starch and improve component yields, e.g., starch yields, for example, while maintaining desirable quality and can decrease the overall steeping time.

The sulfur dioxide levels in each tank 12A-12L can be monitored by methods known in the art. This monitoring allows one to control the sulfur dioxide concentration in the steep water in the first steeping tank 12A, such as by the addition of sulfur dioxide, as identified by numeral 24. This monitoring also helps one evaluate whether the selective addition of sulfur dioxide to any of remaining tanks 12B-12L is necessary to adjust sulfur dioxide levels to at or above desired levels.

In one embodiment, additional steep water having sulfur dioxide can be piped into one or more of steeping tanks 12B-12L, as identified by numeral 26, to counteract the absorption of the sulfur dioxide in the incoming steep water by the corn so that the sulfur dioxide levels can be kept at or above desired levels. In one example, the sulfur dioxide concentration in the additional steep water can be from 150 ppm to 1000 ppm. In another example, the sulfur dioxide concentration can be from 200 ppm to 800 ppm. In yet another example, the sulfur dioxide concentration can be from 200 ppm to 500 ppm. Generally speaking, the desired levels that are maintained are no greater than the sulfur dioxide concentration in the new corn receiving tank 12A. In one example, additional steep water having sulfur dioxide can be added via piping 26 to a plurality of steeping tanks 12B-12L, e.g., steeping tanks 12B-12C, 12B-12E, 12C-12F, or 12B-12J, so that sulfur dioxide levels can be maintained at a concentration of no less than 200 ppm and no greater than 450 ppm. In another example, the desired sulfur dioxide levels are no less than 200 ppm and no greater than 400 ppm. In yet another example, the desired sulfur dioxide levels are no less than 250 ppm and no greater than 400 ppm.

In one embodiment, the sulfur dioxide levels that are maintained by piping additional steep water into a plurality of steeping tanks 12B-12L, e.g., steeping tanks 12B-12J, are substantially equivalent to one another. In one example, the sulfur dioxide levels are considered substantially equivalent when maintained within a 200 ppm range. In another example, the sulfur dioxide levels are considered substantially equivalent when maintained within a 100 ppm range. In yet another example, the sulfur dioxide levels are considered substantially equivalent when maintained within a 50 ppm range. As with the increased sulfur dioxide levels in new corn receiving tank 12A, as discussed above, the sulfur dioxide levels and ranges that are maintained in the steeping process help decrease the bound starch and improve component yields, e.g., starch yields, for example, while maintaining desirable quality and can decrease the overall steeping time.

The steep water during the steeping process is generally maintained at a temperature between about 50° C. to 56° C. And, the pH of the steep water is generally maintained between about 3.5 to 4.5 by methods known in the art. The total steeping time of the corn per tank as it moves from a position of new corn receiving tank 12A to discharge tank 12L is about 32-48 hours, or about 2.5-4 hours per steeping period, although this can vary. And, while twelve steeping tanks 12A-12L are shown, it should be understood that the number of steeping tanks can range from 4 or more up to and including twenty or more. In one example, the number of steeping tanks is from 6 to 12. In another example, the number of steeping tanks is from 8 to 12.

In addition, piping (not shown) can be provided so that steep water from one or more of the steeping tanks 12A-12L can be removed therefrom in the event that too much steep water is present in one or more of steeping tanks 12A-12L, which can detrimentally dilute the desired sulfur dioxide concentration. Piping (not shown) can also be provided so that a portion of the steep water can be optionally recycled from the first steeping tank 12A to the discharge tank 12L. Also, sugar (or a sugar forming compound) may be optionally added to the steep water, along with sulfur dioxide, to the discharge tank, for example, to foster a biomass reaction and help produce lactic acid. And, while corn, such as No. 2 Yellow Dent Corn, can be used in this process, it should be understood that many types and qualities of grain may be substituted. Such other grains can include sorghum, wheat, barley, oats, or rice, for example.

Non-limiting examples of the steeping process and system 10 therefore in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

EXAMPLE 1

With reference to the FIGURE, each steeping tank 12A-12L was initially provided with about 320 tons of air dried Chinese corn having about 12% moisture content. 400 tons per hour (TPH) of incoming steep water 16, which included about 1200 ppm sulfur dioxide, flowed in a direction from the discharge tank 12L to the new corn receiving tank 12A. After one steeping period of about 3.75 hours, the sulfur dioxide levels in the steep water in discharge tank 12L dropped to about 600 ppm to 800 ppm due to absorption thereof by the corn. That steep water was piped to tank 12K whereat after one steeping period, the sulfur dioxide levels in the steep water therein dropped to about 300 ppm to 400 ppm. That steep water was piped to tank 12J and so on, as explained above, whereat the sulfur dioxide levels in tanks 12B-12J were maintained at a substantially equivalent concentration of no less than 200 ppm and no greater than 400 ppm sulfur dioxide. The sulfur dioxide levels were maintained by piping additional steep water therein, as identified by numeral 26, having a sulfur dioxide concentration of 300 ppm. The steep water in the new corn receiving tank 12A included about 1200 ppm sulfur dioxide, which resulted from adding additional sulfur dioxide, as identified by numeral 18 and explained above, to the steep water from 12A, which was initially received from steeping tank 12B. The sulfur dioxide concentration of the original steep water in 12A was increased from 200 ppm to 400 ppm to about 1200 ppm. The exiting steep water 30 from new corn receiving tank 12A was removed from the steeping system via piping at a rate of 214 TPH. The steeping temperature of the steep water was maintained at 50° C. to 53° C. and the pH thereof was about 3.8 to 4.2. And, the total steeping time of the corn was 45 hours.

The discharge corn removed from the discharge tank 12h had a final moisture content of about 44.5%. That corn was subjected to further corn wet milling processes, as known in the art, and provided increased component yields, e.g., increased starch yields, while maintaining a desirable quality.

EXAMPLE 2

With reference to the FIGURE, each steeping tank 12A-12L was initially provided with about 320 tons of air dried Chinese corn having about 14% moisture content. 391 tons per hour (TPH) of incoming steep water 16, which included about 1400 ppm sulfur dioxide, flowed in a direction from the discharge tank 12L to the new corn receiving tank 12A. After one steeping period of about 3.3 hours, the sulfur dioxide levels in the steep water in discharge tank 12L dropped to about 700 ppm to 900 ppm due to absorption thereof by the corn. That steep water was piped to tank 12K whereat after one steeping period, the sulfur dioxide levels in the steep water therein dropped to about 400 ppm to 500 ppm. That steep water was piped to tank 12J and so on, as explained above, whereat the sulfur dioxide levels in tanks 12B-12J were maintained at a substantially equivalent concentration of no less than 200 ppm and no greater than 400 ppm sulfur dioxide. The sulfur dioxide levels were maintained by piping additional steep water therein, as identified by numeral 26, having a sulfur dioxide concentration of 1000 ppm. The steep water in the new corn receiving tank 12A included about 1200 ppm sulfur dioxide, which resulted from adding additional sulfur dioxide, as identified by numeral 18 and explained above, to the steep water from 12A, which was initially received from steeping tank 12B. The sulfur dioxide concentration of the original steep water in 12A was increased from 200 ppm to 400 ppm to about 1200 ppm. The exiting steep water 30 from new corn receiving tank 12A was removed from the steeping system via piping at a rate of 232 TPH. The steeping temperature of the steep water was maintained at 50° C. to 53° C. and the pH thereof was about 3.7 to 4.1. And, the total steeping time of the corn was 40 hours.

The discharge corn removed from the discharge tank 12h had a final moisture content of about 45.1%. That corn was subjected to further corn wet milling processes, as known in the art, and provided increased component yields, e.g., increased starch yields, while maintaining a desirable quality.

Accordingly, an improved process is provided for steeping corn in a corn wet milling process and a steeping system 10 therefore, which can improve component yields, e.g., starch yields, for example, while maintaining desirable quality and which can decrease the overall steeping time.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:
1. A process for steeping corn comprising:
subjecting corn situated in a battery of no less than four steeping tanks to a countercurrent flow of steep water, the first steeping tank defining a new corn receiving tank, the last steeping tank defining a discharge tank, and the countercurrent flow of steep water including sulfur dioxide and flowing in a direction from the discharge tank to the new corn receiving tank the sulfur dioxide concentration in the steep water of the first steeping tank is greater than the sulfur dioxide concentration in a plurality of the remainder of the steeping tanks, which maintain sulfur dioxide levels that are substantially equivalent.

2. The process of claim 1 wherein the sulfur dioxide levels in the plurality of the remainder of the steeping tanks are maintained by adding additional sulfur dioxide to the plurality of the steeping tanks.

3. The process of claim 1 wherein additional sulfur dioxide is added to the first steeping tank so that the sulfur dioxide concentration in the steep water of the first steeping tank is greater than the sulfur dioxide concentrations in the plurality of the remainder of the steeping tanks.

4. The process of claim 1 wherein the sulfur dioxide concentration in the steep water of the first steeping tank is no less than 700 ppm and no greater than 1300 ppm.

5. The process of claim 1 wherein the sulfur dioxide levels in the plurality of the remainder of the steeping tanks are maintained at no less than 200 ppm and no greater than 450 ppm sulfur dioxide.

6. The process of claim 1 wherein the battery of steeping tanks includes no less than six and no greater than twelve steeping tanks.

7. The process of claim 6 wherein the plurality of the remainder of the steeping tanks defines at least four tanks.

8. The process of claim 1 wherein the sulfur dioxide levels in the plurality of the remainder of the steeping tanks are maintained by removing steep water from one or more of the plurality.

9. A process for steeping corn comprising:
   subjecting corn situated in a battery of no less than four steeping tanks and no greater than twenty steeping tanks to a countercurrent flow of steep water, the first steeping tank defining a new corn receiving tank, the last steeping tank defining a discharge tank, and the countercurrent flow of steep water including sulfur dioxide and flowing in a direction from the discharge tank to the new corn receiving tank;
   adding additional sulfur dioxide to the first steeping tank so that the sulfur dioxide concentration in the steep water of the first steeping tank is greater than the sulfur dioxide concentrations in a plurality of the remainder of the steeping tanks; and
   maintaining the sulfur dioxide levels in the plurality of the remainder of the steeping tanks at a substantially equivalent concentration.

10. The process of claim 9 wherein the sulfur dioxide concentration in the steep water of the first steeping tank is no less than 700 ppm and no greater than 1300 ppm.

11. The process of claim 9 wherein maintaining the sulfur dioxide levels in the plurality of the remainder of the steeping tanks includes adding additional sulfur dioxide to the plurality of the steeping tanks to maintain the sulfur dioxide levels in the plurality of the remainder of the steeping tanks at a substantially equivalent concentration.

12. The process of claim 11 further including maintaining the sulfur dioxide levels in the plurality of the remainder of the steeping tanks at a substantially equivalent concentration by removing steep water from one or more of the plurality of the remainder of the steeping tanks.

13. The process of claim 11 wherein the sulfur dioxide levels in the plurality of the remainder of the steeping tanks are maintained at a concentration of no less than 200 ppm and no greater than 450 ppm sulfur dioxide.

14. The process of claim 13 wherein the sulfur dioxide levels are maintained within a 200 ppm range.

* * * * *